United States Patent Office 3,539,445
Patented Nov. 10, 1970

3,539,445
REDUCTION OF IRON CONTENT IN BLEACHING FIBROUS CELLULOSE
Stanley G. Crossland, Carrsville, Va., assignor to Ray I. Thomas, Corpus Christi, Tex.
No Drawing. Filed Aug. 4, 1967, Ser. No. 658,332
Int. Cl. D21c 9/14, 9/16
U.S. Cl. 162—76                              7 Claims

ABSTRACT OF THE DISCLOSURE

There is disclosed a method of producing oxidatively bleached fibrous cellulose wherein at no stage are there present ferric ions to catalyze degradation of the cellulose and the final product is extremely low in iron content, stable and permanently bleached. The method comprises bleaching an aqueous suspension of fibrous cellulose with an inorganic oxidizing agent in the presence of a soluble phosphate, separating the bleached fibers, treating the separated fibers with an aqueous solution of sulfurous acid to reduce the ferric iron present to soluble ferrous salts, adding an organic sequestering agent to chelate the ferrous ions and prevent redeposition or adsorption of iron compounds onto the fibers, and recovering the bleached substantially iron-free fibrous cellulose, the addition of organic sequestering agent being made prior to, during or immediately after the treatment with sulfurous acid.

BACKGROUND OF THE INVENTION

The present invention relates to a method of providing fibrous cellulose material bleached by treatment with an inorganic oxidizing agent, which material contains a minimum of iron in the ferric state.

It has long been known that if fibers so bleached retain even a small amount of iron, either that normally present in the natural fibers or that accumulated from processing equipment, the bleached fibers are deleteriously affected. The iron appears to catalyze reactions which degrade the cellulose, and, moreover, brings about a subsequent color reversion.

The presence of ferric iron during the actual oxidative bleaching is also highly undesirable, causing excessive degradation of cellulose at this stage and destruction of substantial amounts of the inorganic oxidizing agent. It has been proposed to ameliorate this effect by adding to the bleaching bath orthophosphates, pyrophosphates or polyphosphates. This is illustrated by the following U.S. patents: 2,387,771, Hampel; 2,510,595, McEwen et al.; 2,526,839, Astor; 2,822,236, Sheldon et al.; 2,988,514, Robson et al.; 3,251,731, Gard.

The presence of the phosphates does keep the ferric iron concentration very low during actual oxidative bleaching because they tend to solubilize ferric iron over a fairly wide pH range. However, on hydrolysis, they yield the phosphate ion which holds the ferric iron in solution at a low pH only, and, accordingly, considerable iron phosphate, basic iron phosphate or hydrated iron phosphates are left as a precipitate on the residual cellulose fibers after bleaching.

Sheldon et al. Pat. No. 2,822,236, Robson et al. Pat. No. 2,988,514 and Gard Pat. No. 3,251,731 also disclose the addition of an organic sequestering agent to the bleaching bath, but this does little to prevent the deposition of ferric iron on the fibers after bleaching, probably because the organic agent is itself oxidized and becomes inefficient for this purpose.

SUMMARY OF THE INVENTION

The present invention has for its object the provision of a method for oxidatively bleaching fibrous cellulose wherein at no time are there present ferric ions which would bring about degradation of the cellulose, and which results in a final permanently-bleached stable product of extremely low iron content.

The process consists of the following steps:
(1) Bleaching the fibrous cellulose by treatment of an aqueous suspension of it with an inorganic oxidizing agent in the presence of a soluble phosphate;
(2) Separating the bleached fibrous cellulose from the suspension;
(3) Treatment of the bleached fibrous cellulose with an aqueous solution of sulfurous acid to reduce the ferric iron present to a soluble ferrous salt;
(4) Adding an organic sequestering agent to chelate the ferrous ions and prevent redeposition or adsorption of iron compounds onto the fibers of the cellulose; and
(5) Recovering the bleached substantially iron-free fibrous cellulose.

The employment of an organic sequestering agent is essential for the success of the process, and it will comprise a polyaminocarboxylic acid. The organic sequestering agent may be added prior to treatment with aqueous sulfurous acid, as a component of the reducing solution, to the spent reducing solution prior to its removal, or as a separate aqueous solution immediately after separation and discarding of the spent reducing solution.

DESCRIPTION OF THE PREFERRED EMBODIMENTS

The invention will now be fully described in connection with the treatment of wood pulp, but it is to be understood that it is applicable to the treatment of all materials composed of unwoven fibrous cellulose which can be bleached by inorganic oxidizing agents. With respect to wood pulps to which the process of the invention is particularly applicable, the pulp may be any of the conventional products, such as groundwood pulp, chemiground pulp, semichemical pulp, sulfate pulp, sulfite pulp and soda pulp.

Broadly, the process consists of the following steps:
(1) Bleaching the pulp by treatment of an aqueous suspension of it with an inorganic oxidizing agent in the presence of a soluble phosphate;
(2) Separating the bleached pulp from the suspension;
(3) Treatment of the bleached pulp with an aqueous solution of sulfurous acid to reduce the ferric iron present to a soluble ferrous salt;
(4) Adding an organic sequestering agent to chelate the ferrous ions and prevent redeposition or adsorption of iron compounds onto the fibers of the pulp; and
(5) Recovering the bleached substantially iron-free pulp.

It is to be understood that Steps 3 and 4 can be carried out in any sequence or simultaneously. That is to say the sequestering agent can be added to the pulp prior to contacting it with sulfurous acid, simultaneously with the sulfurous acid or after the reduction of the iron compounds with sulfurous acid.

In carrying out Step 1 of the process, the pulp will be in aqueous suspension. The amount of pulp in the suspension can vary from 0.5% to 20% by weight, but low pulp concentrations result in a waste of water and higher concentrations may be too thick for easy handling. It has been found that a concentration of about 4% or 5% is quite satisfactory for all the kinds of wood pulp named above.

The bleaching agent used in Step 1 can be any of the inorganic oxidizing agents conventionally used for bleaching cellulose. Sodium peroxide may conveniently be employed, but other soluble metal peroxides, hydrogen peroxide, chlorine, hypochlorous acid, a soluble inorganic chlorite, chlorine dioxide or a soluble inorganic chlorite may be used. The amount of inorganic oxidizing agent will vary in accordance with the amount of colored impurities present in the pulp being treated, but, in general, it may be said that the concentration of oxidizing agent should be within the range of 0.02% to 30% based on the oven dry weight of the pulp.

The inorganic sequestering agent present during Step 1 will be any of the soluble phosphates which have been heretofore employed in connection with the oxidative bleaching of cellulose. As representative, there may be mentioned orthophosphoric acid, sodium and potassium orthophosphates, sodium and potassium pyrophosphates or sodium polyphosphates. The concentration of phosphate in the bleaching bath will vary in accordance with the amount of iron present in water and pulp. For wood pulp and water with lower concentrations of iron, the amount of inorganic sequestering agent can be kept quite low, but even in such cases, the amount should be at least 0.2% based on the oven dry weight of the pulp. The amount present can range as high as 5% of the weight of the pulp, but it is seldom desirable to use more than 2%.

The pH of the bleaching bath is not critical, since regardless of pH, there will not be sufficient ferric ion present to cause degradation of the cellulose. When the phosphate is added in the form of an orthophosphate, at a low pH the ferric ion is bound in a soluble complex, while at neutrality or a high pH the ferric iron is precipitated as an insoluble salt. At an intermediate pH on the acid side, the ferric iron is in the form of a soluble complex, a precipitate or a combination of both.

In the case of pyrophosphates and polyphosphates, ferric ions are bound in a soluble complex over a wider pH range, and, under ordinary conditions, no precipitation will occur. Sodium tripolyphosphate is the preferred soluble phosphate for use in the present process. If orthophosphate is employed, it is preferred that it be orthophosphoric acid, itself. The resulting low pH insures the binding of ferric ions in a soluble complex. This causes lesser amounts of iron to be present in the pulp upon its subsequent separation, which means that there will be less iron to be removed in the treatment of Steps 3 and 4. However, even using a polyphosphate or orthophosphoric acid in the bleaching stage, appreciable amounts of iron remain in the pulp.

The bleaching operation may be carried out at temperatures ranging between room temperature and 75° C., with the optimum temperature falling within the range of 25° C. to 50° C. The pulp suspension is agitated during bleaching by any suitable mechanical means, or this may be accomplished by steam injection, which will also effect the heating of the suspension. The time of bleaching will vary in accordance with a number of factors, such as the physical nature of the wood fibers, the temperature and the concentration of the oxidizing agent. It can readily be determined when the bleaching operation should be terminated.

Step 2, the separation of the bleached pulp, is carried out employing conventional techniques. Thus, the bleached pulp may be separated from the spent bleaching bath by decantation, filtration or centrifugation. The separated pulp will ordinarily be washed with water to remove as much of the residual components of the bleach as possible.

In accordance with Step 3, the separated bleached pulp, preferably while still wet, is treated with an aqueous solution of sulfurous acid to convert its iron content, which will still be sufficiently high to cause the problems discussed earlier, to soluble ferrous salts which are extracted into the aqueous medium. There may be used a $10^{-12}$ to 0.1 molar solution of sulfurous acid and there may be employed an amount of the solution of from about 1 to 125 times the weight of the pulp on an oven dry basis. It is preferred to use a .001 molar sulfurous acid solution in an amount about 10 times the weight of the pulp.

The treatment with sulfurous acid may be carried out at temperatures between room temperature and 100° C. but a temperature around 50° C. is preferred. The treating solution is preferably agitated to maintain the pulp in suspension. The time of treatment will vary in accordance with a number of factors, but can readily be determined by experimentation, calculating the amount of iron present in the final product.

Little, if any, degradation of the cellulose takes place at this stage, since any residual oxidizing agent is reduced along with the iron, and the sulfurous acid solution does not effect acid hydrolysis of the cellulose. At this point, it is desirable to separate and discard most of the solution containing the ferrous salts in solution before atmospheric oxidation effects conversion to the ferric state, but often this is not possibe from the economic standpoint when a cheap source of water is not available. If the spent solution is to be discarded, this will ordinarily be accomplished by simple decantation, since it is not necessary that all of the iron be eliminated at this point, and, in fact, this cannot be accomplished.

Regardless of whether the spent reducing solution can be discarded, Step 4 of the process, the addition of an organic sequestering agent is essential in producing a final product sufficiently low in iron content that it will remain permanently bleached and stable. The sequestering agent may, in fact, have been added to the separated pulp or Step 2 prior to the addition of the sulfurous acid solution, it can be added as a component of the reducing solution, it can be added to the spent reducing solution after reduction and extraction of the iron content of the pulp, or it can even be added as a separate aqueous solution immediately after the discarding of the spent reducing solution.

It has been found that the organic sequestering agent may comprise any of the polyaminocarboxylic acids which are well known industrially today for the chelation of metallic ions into soluble complexes. These chelating agents are readily available from the Dow Chemical Company under the trade names Versene, Versenol and Iron Specialty. Ethylenediaminetetraacetic acid, diethylenetriaminepentaacetic acid and N-hydroxyethylenediaminetriacetic acid may be mentioned as chelating agents found to be particularly suitable for use in the present invention. All of the chelating agents are ordinarily used in the form of their sodium salts, and it will be understood that reference to the acids in the specification and claims is to include the salt forms.

The amount of organic sequestering agent employed will vary in accordance with the amount of iron left in the pulp separated after the oxidative bleaching step and whether the spent liquor is discarded after reduction with sulfurous acid and before addition of the sequestering agent. Assuming a good separation of the spent liquor, the amount may be as low as 0.005% by weight on the basis of oven dry pulp. On the other hand, if the bleached pulp still has a fairly high iron content and the sequestering agent is to be present in the sulfurous acid, itself, the amount employed may be as high as 5.0% on this same basis. The requirement is, of course, that there be sufficient of the organic sequestering agent present to chelate substantially all of the iron present, keep it in a soluble form and prevent its redeposition in or onto the cellulose fibers.

The sequestering agent effectively chelates the iron ions at any temperature which would be used in the reduction procedure.

Step 5, the recovery of the bleached, substantially iron-free pulp, is, as was the case with Step 2, carried out by any of the separation techniques well known to the art, for example, decantation, filtration or centrifugation. The separated pulp when dried will contain no more than 10 parts per million of iron, and will remain indefinitely in a white and undegraded condition.

The following examples are set forth as illustrative of but not as limiting the invention:

EXAMPLE 1

An aqueous suspension of wood pulp containing 5% by weight of the pulp on an oven dry basis, 4% by weight of sodium hypochlorite based on the oven dry weight of the pulp and 0.5% of sodium tripolyphosphate based on the oven dry weight of the pulp was heated with agitation for 30 minutes at a temperature of about 50° C., the pulp initially containing 0.1 mg. of iron per gram of pulp.

The pulp was allowed to settle, the spent bleaching solution was decanted off, the pulp was washed with water with decantation and then filtered.

Without drying, the separated bleached pulp was heated for 15 minutes at 50° C. with agitation with about 10 times its weight on an oven dry basis of an aqueous solution 0.001 molar with respect to sulfurous acid and 0.001 molar with respect to the tetrasodium salt of ethylenediaminetetraacetic acid.

The resulting mixture was filtered with suction and the final bleached pulp was found to have $1.2 \times 10^{-4}$ mg. of iron per gram on an oven dry basis.

EXAMPLE 2

The procedure of Example 1 was followed except that sodium peroxide was substituted for sodium hypochlorite as the oxidizing agent. The final product was found to contain $1.0 \times 10^{-4}$ mg. of iron per gm. of pulp on an oven dry basis.

EXAMPLE 3

The procedure of Example 1 was followed except that the pentasodium salt of diethylenetriaminepentaacetic acid was substituted for the tetrasodium salt of ethylenediaminetetraacetic acid. The final product was found to contain $1.1 \times 10^{-4}$ mg. of iron per gram of pulp on an oven dry basis.

EXAMPLE 4

The procedure of Example 2 was followed except that the pentasodium salt of diethylenetriaminepentaacetic acid was substituted for the tetrasodium salt of ethylenediaminetetraacetic acid. The final product was found to contain $1.8 \times 10^{-4}$ mg. of iron per gram of pulp on an oven dry basis.

What is claimed is:

1. A process for oxidatively bleaching fibrous cellulose having an undesirably high iron content, comprising bleaching an aqueous suspension of said cellulose with an inorganic oxidizing agent in the presence of a soluble phosphate, separating substantially all of the resulting bleached cellulose from said suspension, treating said separated bleached cellulose with an aqueous solution of sulfurous acid to reduce the ferric iron present to a soluble ferrous salt, sequestering the ferrous ions of said salt by contacting them in aqueous solution with a polyaminocarboxylic acid added subsequent to the separation of said bleached cellulose from said suspension, and recovering bleached fibrous cellulose of extremely low iron content.

2. A process as claimed in claim 1 in which said fibrous cellulose is wood pulp.

3. A process as claimed in claim 2 in which said bleached pulp is treated with aqueous sulfurous acid at a temperature within the range of from room temperature to 100° C.

4. A process as claimed in claim 2 in which said polyaminocarboxylic acid is a member selected from the group consisting of ethylenediamine tetraacetic acid, diethylenetriaminepentaacetic acid and N-hydroxyethylenediaminetriacetic acid.

5. A process as claimed in claim 2 in which said ferrous ions are sequestered by dissolving said polyaminocarboxylic acid in said aqueous solution of sulfurous acid.

6. A process as claimed in claim 2 in which said aqueous solution of sulfurous acid used is from $10^{-12}$ to 0.1 molar and it is employed in an amount from 1 to 125 times the weight of said pulp on an oven dry basis.

7. A process as claimed in claim 2 in which the amount of polyaminocarboxylic acid used is from 0.005% to 5.0% based on the oven dry weight of said pulp.

References Cited

UNITED STATES PATENTS

| 1,923,292 | 8/1931 | Bassett | 162—73 |
| 2,988,514 | 6/1961 | Robson | 252—187 |

S. LEON BASHORE, Primary Examiner

R. H. ANDERSON, Assistant Examiner

U.S. Cl. X.R.

162—71, 78, 82, 87